US012140259B2

(12) United States Patent
Johnson et al.

(10) Patent No.: US 12,140,259 B2
(45) Date of Patent: *Nov. 12, 2024

(54) HOT SWAPPABLE FRACTURING PUMP SYSTEM

(71) Applicant: Downing Wellhead Equipment, LLC, Oklahoma City, OK (US)

(72) Inventors: Austin C. Johnson, Edmond, OK (US); Tim Marvel, Oklahoma City, OK (US); Kyle Schultz, Oklahoma City, OK (US)

(73) Assignee: DOWNING WELLHEAD EQUIPMENT, LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,115

(22) Filed: May 22, 2023

(65) Prior Publication Data
US 2023/0288010 A1  Sep. 14, 2023

Related U.S. Application Data

(63) Continuation of application No. 17/591,321, filed on Feb. 2, 2022, now Pat. No. 11,655,926, which is a continuation of application No. 16/436,189, filed on Jun. 10, 2019, now Pat. No. 11,242,950.

(51) Int. Cl.
*F16L 55/10*  (2006.01)
*E21B 43/26*  (2006.01)

(52) U.S. Cl.
CPC .......... *F16L 55/1022* (2013.01); *E21B 43/26* (2013.01)

(58) Field of Classification Search
CPC .................. F16L 55/1022; E21B 43/2607
See application file for complete search history.

(56) References Cited

U.S. PATENT DOCUMENTS

| | | | |
|---|---|---|---|
| 4,014,567 A * | 3/1977 | Arnold | F16L 37/086 |
| | | | 285/317 |
| 9,677,391 B2 * | 6/2017 | Banks | E21B 43/2607 |
| 10,408,031 B2 * | 9/2019 | Oehring | E21B 21/062 |
| 10,550,659 B2 * | 2/2020 | Kibler | F16L 37/002 |
| 10,642,242 B2 * | 5/2020 | Webber | G05B 19/0428 |
| 11,242,950 B2 * | 2/2022 | Johnson | F16L 37/002 |
| 2017/0016433 A1 * | 1/2017 | Chong | F04B 23/06 |

* cited by examiner

*Primary Examiner* — Kevin F Murphy
(74) *Attorney, Agent, or Firm* — HAYNES AND BOONE, LLP

(57) ABSTRACT

A system that permits fracturing pumps such as, for example, at least first and second fracturing pumps, each carried on a truck, to be connected to, and disconnected from, respective connection points on a fracturing manifold while fracturing fluid in the fracturing manifold is at pressure, in certain instances at or near fracturing pressure, and/or while other(s) of the fracturing pumps are being operated to pump fracturing fluid.

28 Claims, 9 Drawing Sheets

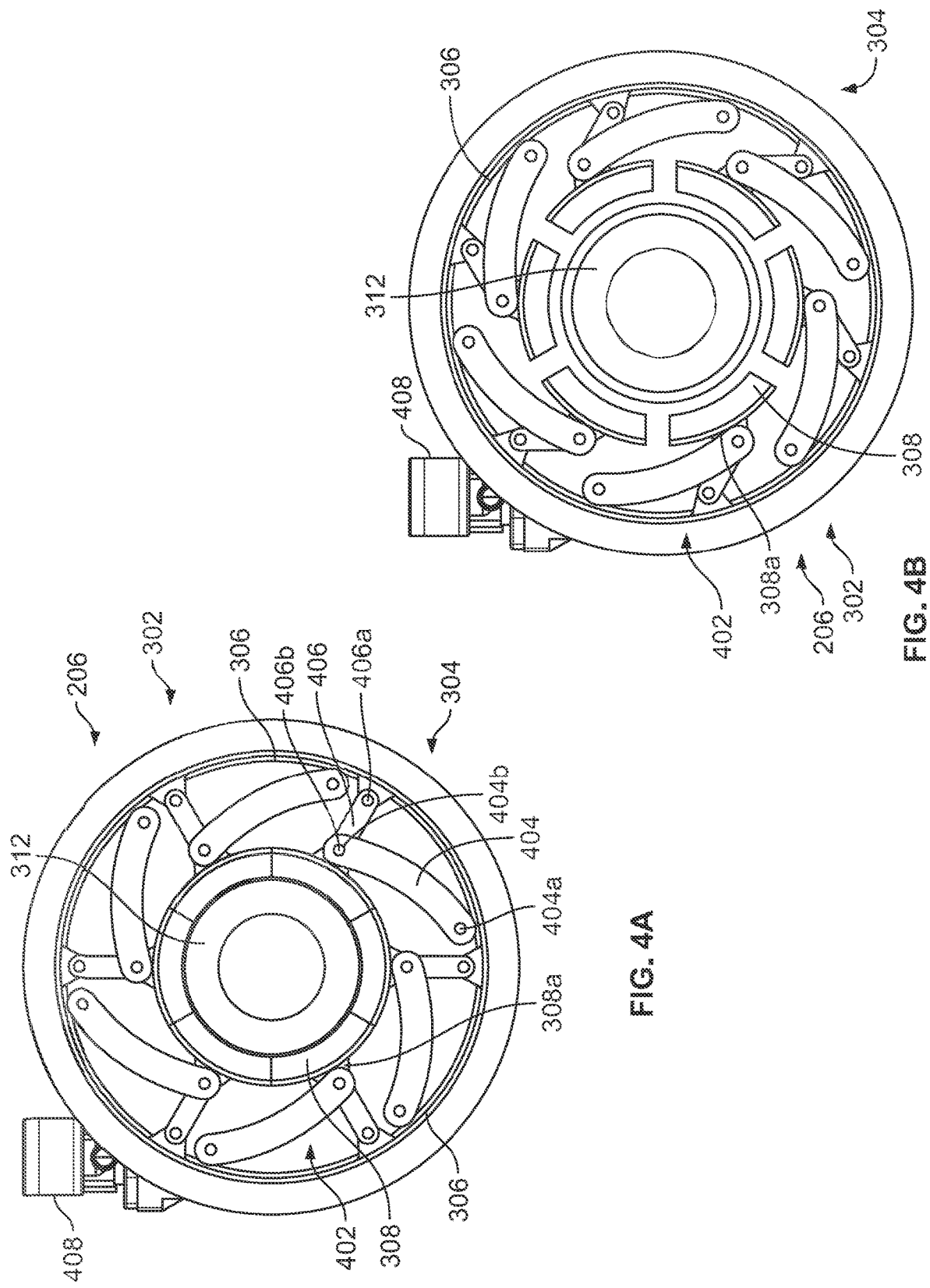

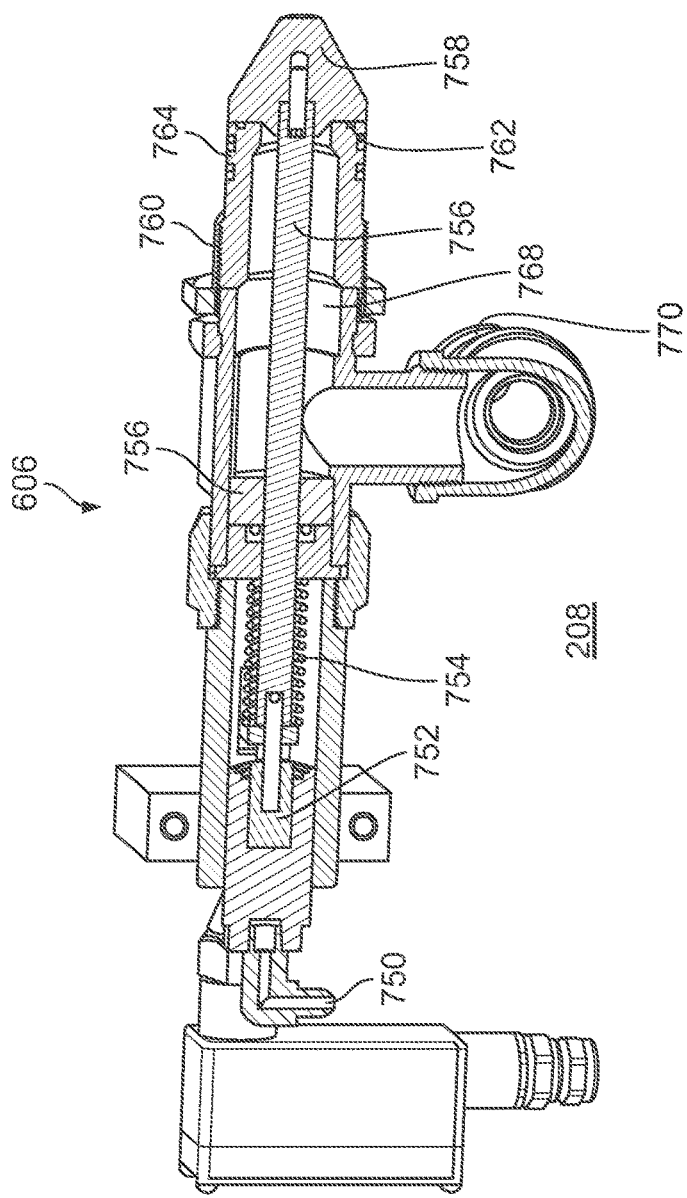
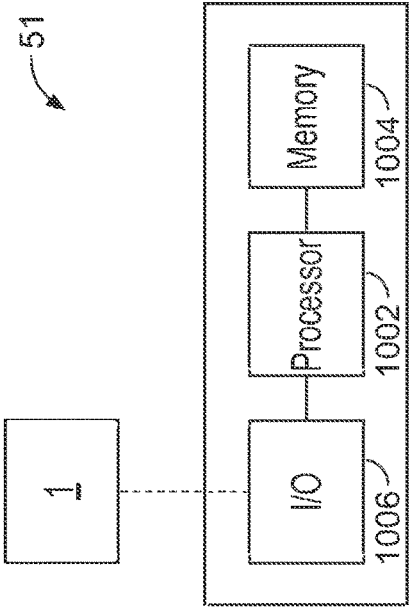

HOT SWAPPABLE FRACTURING PUMP SYSTEM

CROSS-REFERENCE TO RELATED APPLICATIONS

This application is a continuation of U.S. patent application Ser. No. 17/591,321, filed Feb. 2, 2022, which is a continuation of U.S. patent application Ser. No. 16/436,189, filed Jun. 10, 2019, now issued as U.S. Pat. No. 11,242,950, the entire disclosures of which are hereby incorporated herein by reference.

TECHNICAL FIELD

The present disclosure relates to fracking and well workover operations.

BACKGROUND

A subterranean formation surrounding a well may be fractured to improve communication of fluids through the formation, for example, to/from the well. Fracturing typically uses multiple high-pressure, high-flow pumps to send high-pressure fluid downhole. The high-pressure and high-flow pumps are often plumbed to a manifold called a "missile" in a parallel configuration to achieve sufficient flow-rates and pressures to fracture the formation. The pressure in the manifold, particularly during fracturing operations (i.e., frac pressure), is very high. If a leak were to develop, or the equipment to fail, it could be injurious to personnel close to manifold. The area near the manifold where a worker could be injured is sometimes referred to as the "red zone."

DESCRIPTION OF DRAWINGS

FIGS. 4A-4B are top-down views of the example connector of FIGS. 3A-3B shown closed (FIG. 4A) and open (FIG. 4B).

FIGS. 8A-8B is a perspective view and a half cross-sectional view, respectively, of an example drain assembly.

FIG. 9 is a block diagram of a controller that can be used with aspects of this disclosure.

Like reference numbers in the various drawings indicate like elements.

DETAILED DESCRIPTION

During fracturing operations, the "missile" or frac manifold has multiple connected pumps. Typically, the entire system must be depressurized to remove or change-out a pump, for example, if the pump needs maintenance, fails, or is no longer needed. The depressurization, disconnection, reconnection, and repressurization process can take a significant amount of time. This disclosure describes an example system that allows disconnections/connections of pumps to the manifold to be made without depressurizing the manifold and associated fluid lines. In other words, pumps can be "hot swapped." Moreover, the pumps can be disconnected and connected without the need for personnel near the high pressure aspects of the manifold, i.e., without placing personnel in the dangerous "red zone."

Figure 1:
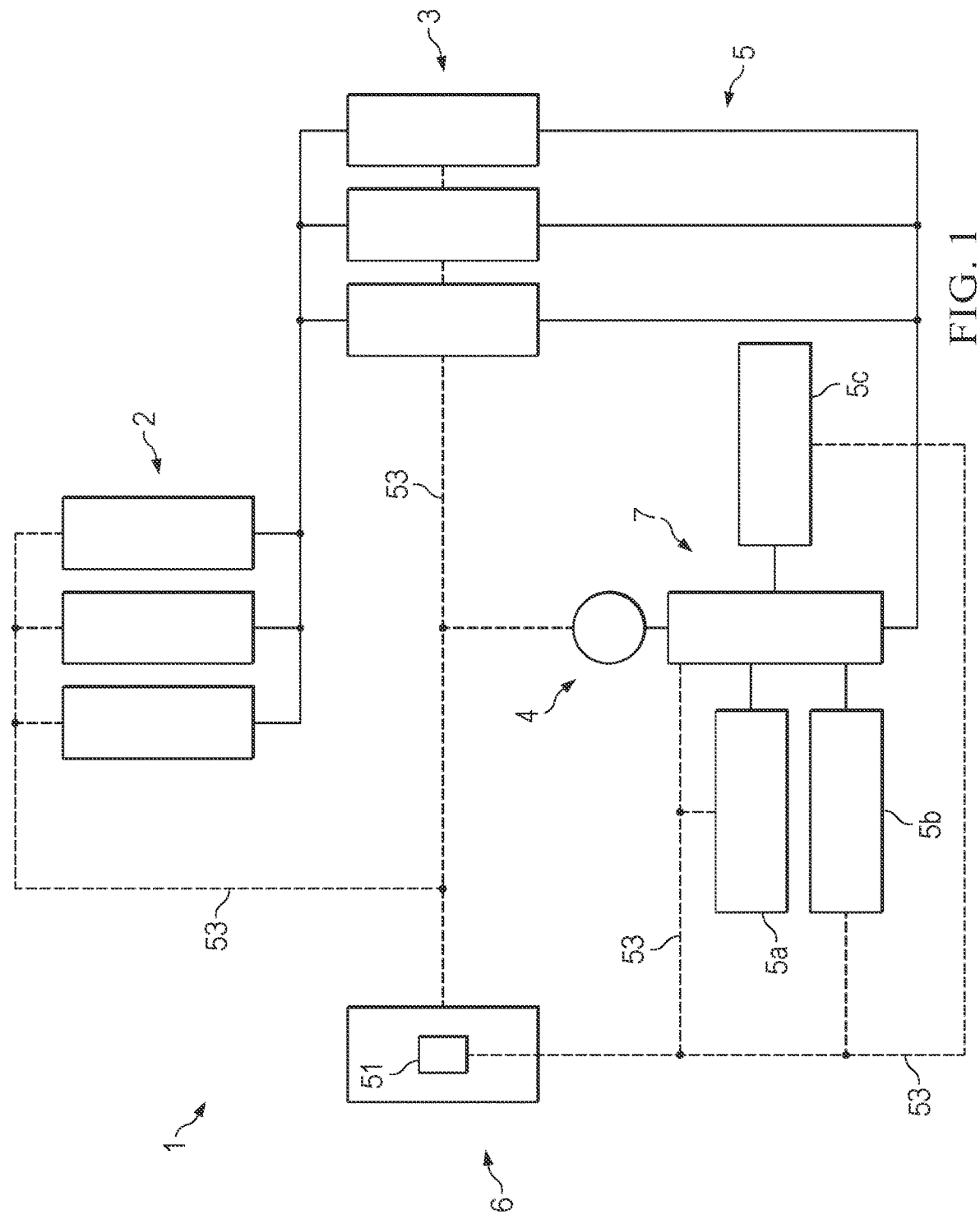
FIG. 1 is a schematic diagram of an example well fracking site.

FIG. 1 is a schematic diagram of an example well site 1 arranged for fracking. The well fracking site 1 includes tanks 2. The tanks 2 hold fracking fluids, proppants, and/or additives that are used during the fracturing process. The tanks 2 are fluidically coupled to one or more blenders 3 at the well site 1 via fluid lines (the one or more pipes, hoses, tubing and other types of fluid lines that define a fluid path). The blenders mix the fracking fluids, proppants, and/or additives prior to being pumped into the well 4. The blenders 3 are fluidically coupled to a fracturing manifold 7, or "missile." One or more fracking pumps 5 are also fluidically coupled to the manifold 7; for example, fracking pumps 5a, 5b, and 5c may be fluidically coupled to the manifold 7, as shown in FIG. 1. The manifold 7 routes the blended fluid to the pumps 5, which then increase the pressure of the fluid to fracking pressure (i.e., the pressure at which the target formation fractures). Then, the flow from the pumps is comingled in the manifold 7 and directed into the well 4. A data van 6 is electronically connected to the tanks 2, the blenders 3, the well 4, and the fracturing pumps 5. The data van 6 includes a controller 51 that controls and monitors the various components at the well site 1. The controller 51 is in communication with various component of the fracking site 1 through one or more communication links 53.

While a variety of components have been described in the example well site 1, not all of the described components need be included. In some implementations, additional and/or different equipment may also be included. Also, the well 4 can be an onshore or offshore well. In the case of an offshore well, including subsea wells and wells beneath lakebeds or other bodies of water, the well site 1 is on a rig or vessel or may be distributed among several rigs or vessels.

Figure 2:
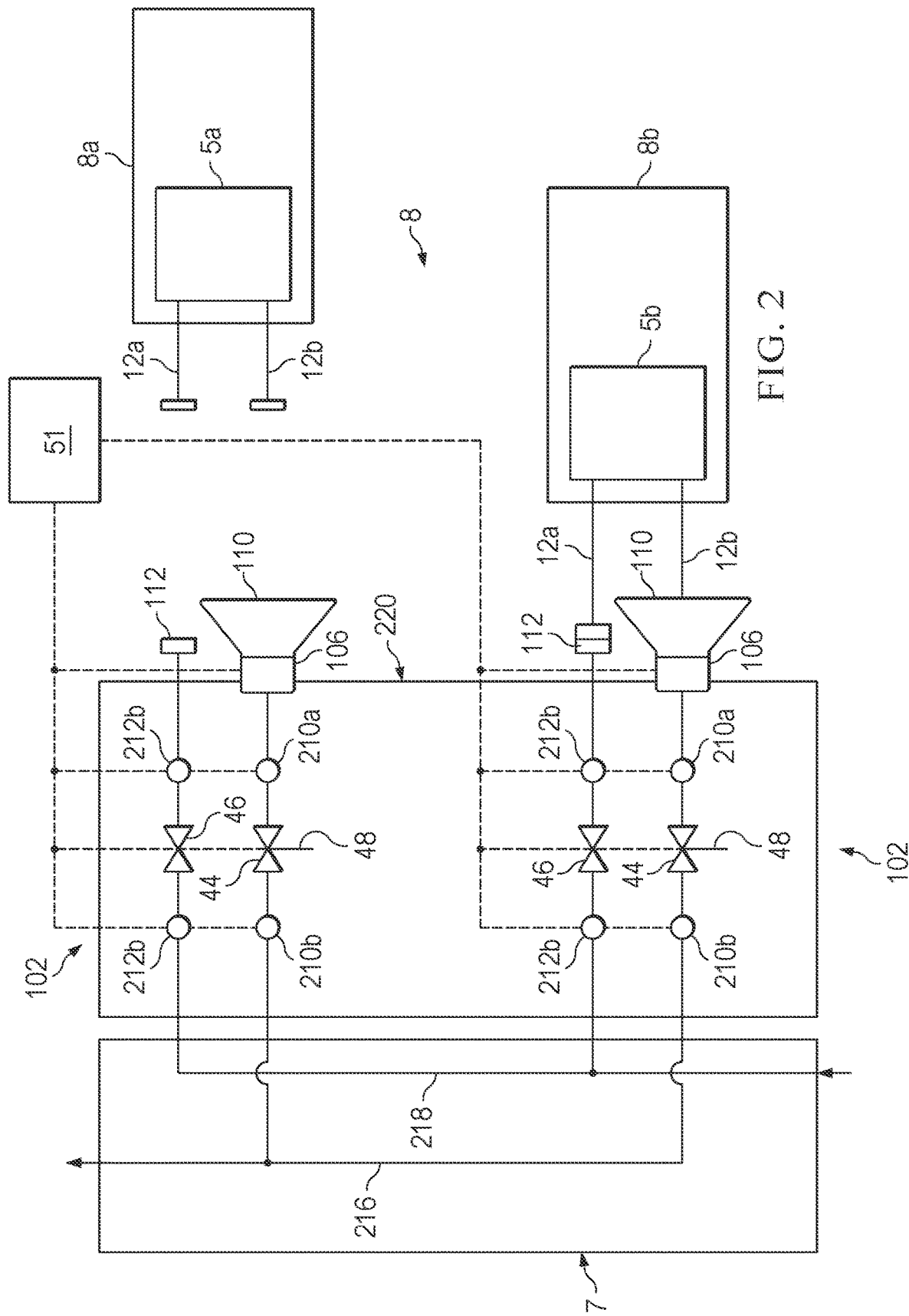
FIG. 2 is a schematic diagram of an example connection configuration that can be used with aspect of this disclosure.

FIG. 2 is a schematic of an example fracturing manifold 7 with multiple connection points 102 for connecting the fracking pumps 5, which are each carried on a truck 8; for example, the fracking pumps 5a and 5b carried on trucks 8a and 8b, respectively, may each be connected to one of the connection points 102. The manifold 7, itself, is often configured on a skid that can be transported as a unit or integrated with a trailer that can be towed to the well site. The concepts herein encompass a system that allows the fracturing pumps 5 to be connected to and disconnected from the fracturing manifold 7 while fracturing fluid in the manifold 7 is at pressure, in certain instances at or near fracturing pressure, and/or while the other pumps 5 are being operated to pump fracturing fluid. The fracking trucks 8 can back into a perspective location, and without a worker needing to be between the truck and manifold 7, a pump 5 can be fluidically and mechanically connected at a connection point 102. Similarly, when a pump 5 is to be removed, the pump 5 can be disconnected from the manifold 7, and allow the truck 8 leave the manifold 7, without a worker needing to be between the truck and manifold. The workers do not need to physically connect/disconnect hoses or make/break connectors when removing, adding or swapping pumps 5, allowing the workers can remain away from the "red zone." In certain instances, the connection is made entirely automatically, without worker intervention.

As illustrated, the manifold 7 has multiple connection points 102 (two shown, but in practice, many more are provided—often 14 to 20 arranged on both sides of the manifold 7). The connection point 102 includes two sets of fluid lines—a high pressure side and a low pressure side. The fluid line of the high pressure side has a high side valve 44, a bleed line 48 and a high side connector 106 and is connected to the high pressure fluid line 216. The high pressure fluid line 216 is fluidically coupled to the well. It collects pumped fluid from each pump 5 and directs the pumped fluid to the well. The fluid line of the low pressure side has a low side valve 46 and a low side connector 112, and is connected to the low pressure fluid line 218. The low pressure fluid line 218 is fluidically coupled to the blender. It directs the blended frac fluid to the pumps 5 so that the fluid can be pumped. The high side valve 44 can be closed to seal against pressure in the manifold 7 in the high pressure line 216 to the well, thus isolating the connection point 102 from the pressure in the manifold 7 produced by the other connected pumps. The low side valve 46 can be closed to seal against pressure in the manifold 7 in the low pressure line 218 from the blenders, thus isolating the connection point 102 from the low pressure supply of frac fluid. The valves 44, 46 can be manual or, in certain instances, either or both can be actuable in response to a signal to open/close. Actuable valves 44, 46 enable the operation to be controlled by the controller 51. Bleed line 48 enables draining high pressure fluid between the valve 44 and high side connector 106. The bleed line 48 can be integrated with the valve 44, the high side connector 106 or can be valved in the line between the two. In certain instances, the bleed line 48 is actuable to open in response to a signal (e.g., by use of an actuable valve). Also, while the connection point 102 has been illustrated and described as having a single valve for each of the high and low pressure sides, alternative or additional valve configurations can be used without departing from this disclosure. For example, particularly on the high pressure side, a second valve can be included in series with the first valve. Adding a second valve in series with the first valve allows for a double block and bleed or a double block and monitor configuration.

The high pressure side connector 106 is configured to connect/disconnect the discharge line 12b (i.e., discharge) of a pump 5 on a frack truck 8 to the manifold 7. When connected, the high pressure side connector 106 secures to and seals with the discharge line 12b, and is capable of handling the high pressure provided by the pump 5 during the fracturing treatment. In certain instances, the high side connector 106 is actuable in response to a signal to connect/disconnect, which enables the operation of the high side connector 106 to be controlled by the controller 51. The low pressure side connector 112 can be the same type of connector as the high side connector 106 or another type of connector. Typically, though, the low pressure side connector 112 need only be configured to seal to the lower pressure of the low pressure line 12a (i.e., suction) of the pump 5 (and not the high pressure produced by the pump 5 or in the manifold). As discussed in more detail below, in certain instances, the low pressure side connector 112 is a male or female stab type connector. The connectors 106, 112 can be mounted at a specified height off the ground to align to the fluid lines from the pump 5. In some implementations, one or both of the connectors 106, 112 can be mounted on an adjustable platform that can be adjusted to suit different configurations of trucks.

As illustrated, a first high pressure side pressure sensor 210a is positioned to sense internal pressure on the side of the valve 44 attached to the high side connector 106. A second high pressure side pressure sensor 210b detects internal pressure on a side of the valve exposed to the pressure within the high pressure line 216 of the fracking manifold 7. A similar arrangement of pressure sensors are provided on the low pressure side, with a first low pressure side pressure sensor 212a positioned to sense internal pressure on the side of the valve 46 attached to low side connector 112. A second low pressure side pressure sensor 202b is positioned to detect internal pressure on a side of the valve exposed to pressure within the low pressure line 218 of the fracking manifold 7. In certain instances, the pressure sensors 210a, 210b, 212a, 212b can be used to implement electronic interlocks to prevent the valve 44 and/or valve 46 from being opened under pressure or the high side connector 106 and/or low side connector 112 from disconnecting under pressure. For example, depending on the formation, frac pressure in the high pressure fluid line 216 can reach 15 thousand pounds per square inch (ksi) or more. If the controller 51 detects, with the second pressure sensor 210b, such a high pressure and detects, with the first pressure sensor 210a, a much lower pressure (e.g., near atmospheric), then controller 51, based on output from the sensors 210a, 210b can effectuate an interlock to prevent the valve 44 from opening. After a fracturing pump at the connection point 102 has been pressurized, the first pressure sensor 210a and second pressure sensor will detect similar pressures, and the controller may allow valve 44 to open, but prevent the high side connector 106 from disconnecting. The pressure differential threshold at which the controller 51 effectuates the interlock of the valve 44 can be specified to the controller 51. Similarly, the pressure threshold, over which the controller 51 prevents operation of the connector 106 can also be specified to the controller 51. More details on example interlocks are described throughout this disclosure.

In some implementations, the high side connector 106 includes a guide cone 110 mounted to a housing of the high side connector 106. The guide 110 guides the discharge line 12b of the fracturing pump 5 align with the high side connector 106. For example, in instances where the fracturing pump 5 is mounted to a fracturing truck 8, the truck 8 can back up to the fracturing manifold 7 and "stab" the discharge line 12b into the connector 106. The guide 110 has a conical funnel shape that has a narrower end nearer the connector 106 and a wider end opposite the narrower end. The conical shape of the guide 110 drives the discharge line 12b into concentric alignment with the high side connector 106, allowing the discharge line 12b to be concentrically received within the connector 106. While described primarily with a funnel shape, other shapes (e.g., pyramidal or other) or other guidance features can be used without departing from this disclosure. In certain instances, the discharge line 12b or connection point 102 can have an in-line flex coupling or otherwise have flexibility to enable flex to account for misalignment when the discharge line 12b is stabbed into the high side connector 106. Thus, the truck 8 with the pump 5 will need to back into proximity to the connection point 102, but need not precisely position with respect to the high side connector 106. In certain instances, the discharge line 12b and suction line 12a can be affixed, relative to one another, near their free ends by a strut or some other structure, so that when the discharge line 12b has been concentrically aligned by the guide cone 110, the position of the suction line 12a is likewise concentrically aligned to stab into the low side connector 112 as the discharge line 12b stabs into high side connector 106. Such an arrangement can be implemented with only the guide cone 110 on the high side connector 106, and no guide cone on the low side connector 112. Although not shown in FIG. 2, the low pressure side can, in certain instances, have a guide cone 110 on low side connector 112 to facilitate alignment of the suction line 12a with low side connector 112.

In certain instances, the hardware of the connection points 102, including the valves 44, 46, the connectors 106, 112, the sensors and other related components can be mounted on a trailer or skid 220 separate from the manifold 7. The skid 220 can be set beside the manifold 7, and fluid connections made-up between the fluid lines on the skid 220 and the manifold 7 to establish the connection points 102 as connection points to the manifold 7. The hardware for each connection point 102 can be on a separate skid 220, or a single skid 220 can carry the hardware for more than one connection point 102. For example, in certain instances, a skid 220 may carry the hardware for a pair of connection points 102. In certain instances, one, two or three skids may carry the hardware for all the connection points 102 on one side of the manifold 7. Other configurations are contemplated. In certain instances, the hardware of the connection points 102 is partially or wholly integrated with the manifold 7, so that the skid or trailer carrying the manifold 7 likewise carries the hardware for some or all of the connection points 102.

The high pressure side connector 106 can take a number of different forms. For example, the high pressure side connector 106 can be an iris type, with clamps that move on a spiral type path inward to effectuate clamping. In another instance, the high side connector 106 can be a cam actuated or rotational actuated type connector, a gate action connector (where one part swings over a shoulder an another part and locks), a notch connector (where a latching component is laid into a notch that locks it in place) or an internal latch (with an expanding latch that grips an internal profile. Other connector configurations are possible, and contemplated herein.

In certain instances, only the pump discharge line 12b is stabbed into the connection point 102, and the pump suction line 12a is connected manually, using a length of hose with a manual connector 112 on its end that extends from the connection point 102 and is long enough to enable a worker making the connection to remain a safe distance from the high pressure of the manifold 7. In other words, the hose is long enough to allow the worker to make the connection while staying out of the "red zone." In certain instances, the low pressure side connector 112 is a stab connector—where a machined female bore internally receives and seals with a male stab. Typically the male stab includes seals that seal to the side wall of the inner female bore, but in certain instances, the seals could be provided on the female bore. The male stab can be provided on suction line 12a and the female provided as connector 112 or vice versa. In such a case, the low side connector 112 can rely on the high pressure side connector 106 to secure the male stab axially in the stab receptacle.

While illustrated and described as being at the manifold 7, similar connection points 102 can be included elsewhere within the fracturing site 1, such as at the fluid lines of fracturing tanks, blender, and elsewhere. Such connection points 102 allow components to be added and removed to the system quickly without depressurizing system components.

Figure 3B:
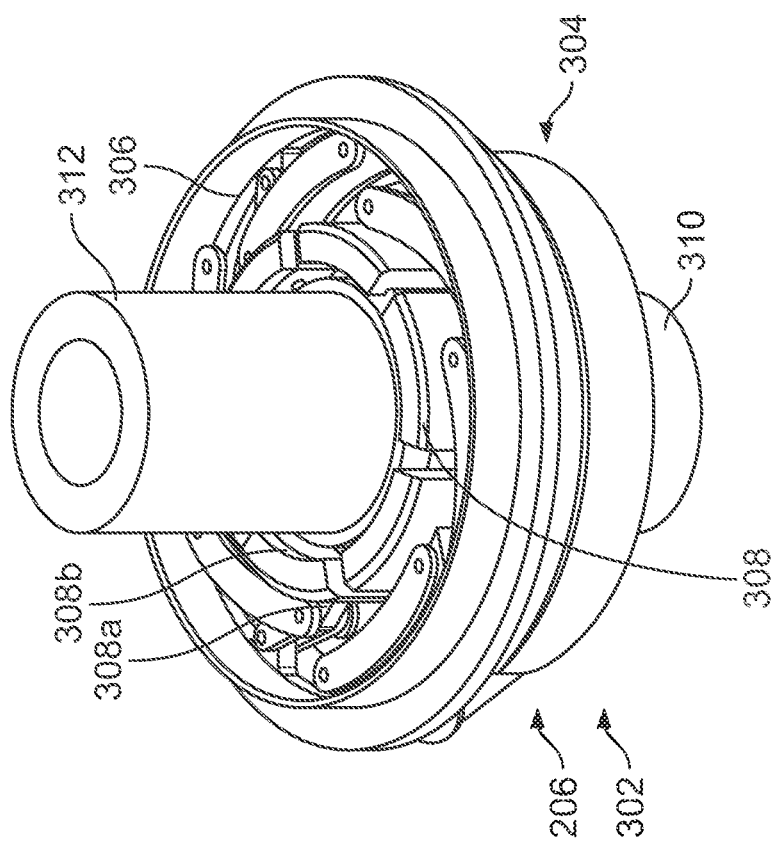
FIGS. 3A-3B are perspective views of an example connector shown closed (FIG. 3A) and open (FIG. 3B).
Figure 3A:
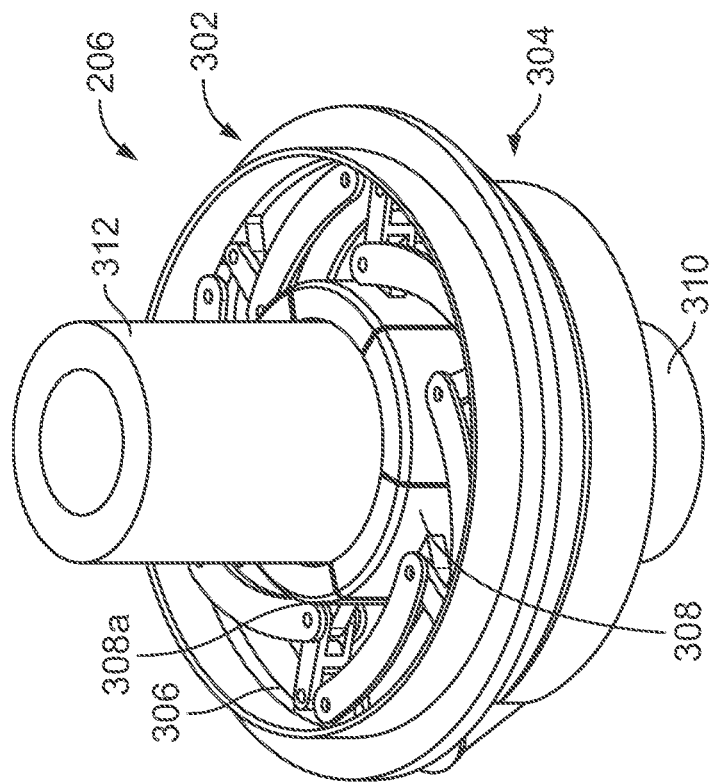

FIGS. 3A-3B are perspective views of an example connector 302, which can be used as high side connector 106, shown closed/engaged (FIG. 3A) and open/disengaged (FIG. 3B). The connector 302 is actuable in response to a signal (e.g., hydraulic, electric and/or other) to secure (i.e., lock) a tool to the fracturing stack 200 as well as any tools and other stack components positioned above the connector 302, such as the lubricator 202 or BOP 204. The connector 302 includes a housing 304. The housing 304 carries a drive ring 306 that is rotatable relative to the housing 304. The housing 304 receives a first line 310 from the manifold and a second line 312 from the pump 5 (e.g., discharge line 12b or suction line 12a), such that the housing is positioned around the lines. As illustrated, the drive ring 306 protrudes outward from an outer perimeter of the housing 304. One or more clamps 308 (six are shown—each defining an arc segment of a circle) are within the housing to clamp to the lines 310, 312. Each clamp 308 includes an attachment end 308a and a clamping end 308b. The clamp 308 is movable between an engaged position (FIG. 3A) and a disengaged position (FIG. 3B). In the engaged position, the clamp 308 engages the second line 312 by the clamping end 308b. In the disengaged position, the clamp 308 allows the well tool to become unrestrained from the connector 302.

A linkage 402 is coupled to the drive ring 306, the housing 304, and the clamp 308. The linkage 402 is movable between a first position supporting the clamp in the engaged position (FIG. 3A) and a second position supporting the clamp in the disengaged position (FIG. 3B). The linkage 402 is movable between the first position and the second position by rotating the drive ring 306.

FIGS. 4A-4B are top-views of the example connector of FIGS. 3A-3B. As illustrated the connector has multiple linkages, one for each clamp. In some implementations, additional or fewer clamps and linkages can be used. In general, the linkages are configured to move concurrently with one another. For example, the linkages 402 are shown as all being coupled to the same drive ring 306.

Each of the linkages includes a first arm 404 with a first end 404a and a second end 404b. The first end 404a of the first arm 404 is hingedly coupled to the housing 304. That is, the first end 404a of the first arm 404 has a single degree of freedom to rotate about a pivot point fixed to the housing 304. This single degree of freedom is in the same plane as the drive ring 306. A second arm 406 has a first end 406a and a second end 406b. The first end 406a of the second arm 406 is hingedly coupled to the drive ring 306. That is, the first end 406a of the second arm 406 has a single degree of freedom to rotate about a pivot point fixed to the drive ring 306. This single degree of freedom is in the same plane as the drive ring 306. The second end 406b of the second arm 406 is hingedly coupled to the second end 404b of the first arm 404. The clamp 308 is coupled to the second end 404b of the first arm 404 and the second end 406b of the second arm 406. The attachment end 308a of the clamp 308 is coupled to the second end 404b of the first arm 404 and the second end 406b of the second arm 406.

The drive ring 306 is coupled to an actuator 408 configured to operate in response to a signal. In some implementations, the actuator 408 is a rotary actuator. In such instance, the drive ring 306 can include multiple teeth on an outer circumference of the drive ring 306. The teeth can engage with a pinion gear on the rotary actuator 408, which the rotary actuator 408 rotates to drive rotation of the drive ring 306. In some implementations, the drive ring 306 can be coupled to a separate drive gear surrounding the first line 310 or the second line 312. The separate drive gear can then be coupled to the actuator 408. In some implementations, a chain drive can be used to connect the actuator gear to the drive ring or the drive gear. In some implementations, all or part of the gearing system may be retained and protected within the housing 304. In some implementations, the actuator 408 can be a linear actuator. In such an implementation, the actuator is attached directly to the drive ring 306 by a linkage, such that when the actuator 408 extends, linearly, it rotates the drive ring 306.

Figure 5:
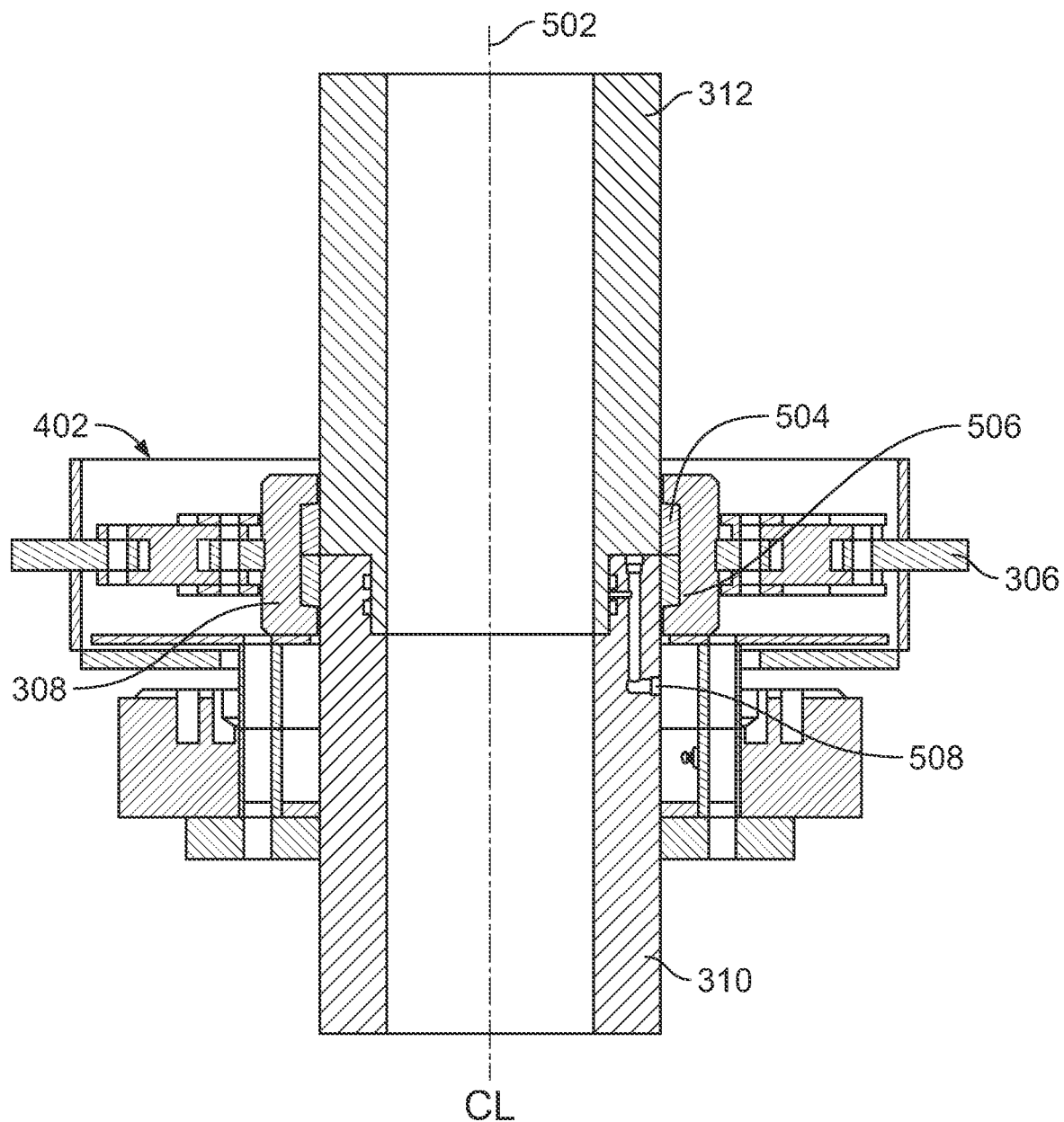
FIG. 5 is a half side cross-sectional view of the example connector of FIGS. 3A-3B in the closed position.

FIG. 5 is a side cross-sectional view of an example connector in the closed position. The first line 310, the second line 312, and the housing 304 are aligned on a common center axis 502 (i.e., concentric), and the line 312 has a male stab 514 that is received and sealed in a female receptacle 512 of line 310 (or vice versa). The drive ring 306 is rotatable about the common center axis 502. As illustrated, the first line 310 and the second line 312 have hubs 508a, 508b at their ends that form a male profile 504 when mated together and the first line 310 stabs into the second. The clamps 308 each have a female profile 506 shaped to receive the male profile 504. The combination of profiles allows the connector to lock the first line 310 and the second line 312 together, as the female profile 506 axially bounds the male profile 504—holding the two lines 310, 312 axially together—and the clamps 308 circumferentially enclose the male profile 504—laterally holding the two lines 310, 312 together.

In some implementations, a pressure port 508 in the first line 310 communicates to the interior bore of the lines 310, 312. A pressure sensor connected at this pressure port 508 can sense the pressure within the interior bore of the lines 310, 312.

Figure 6:
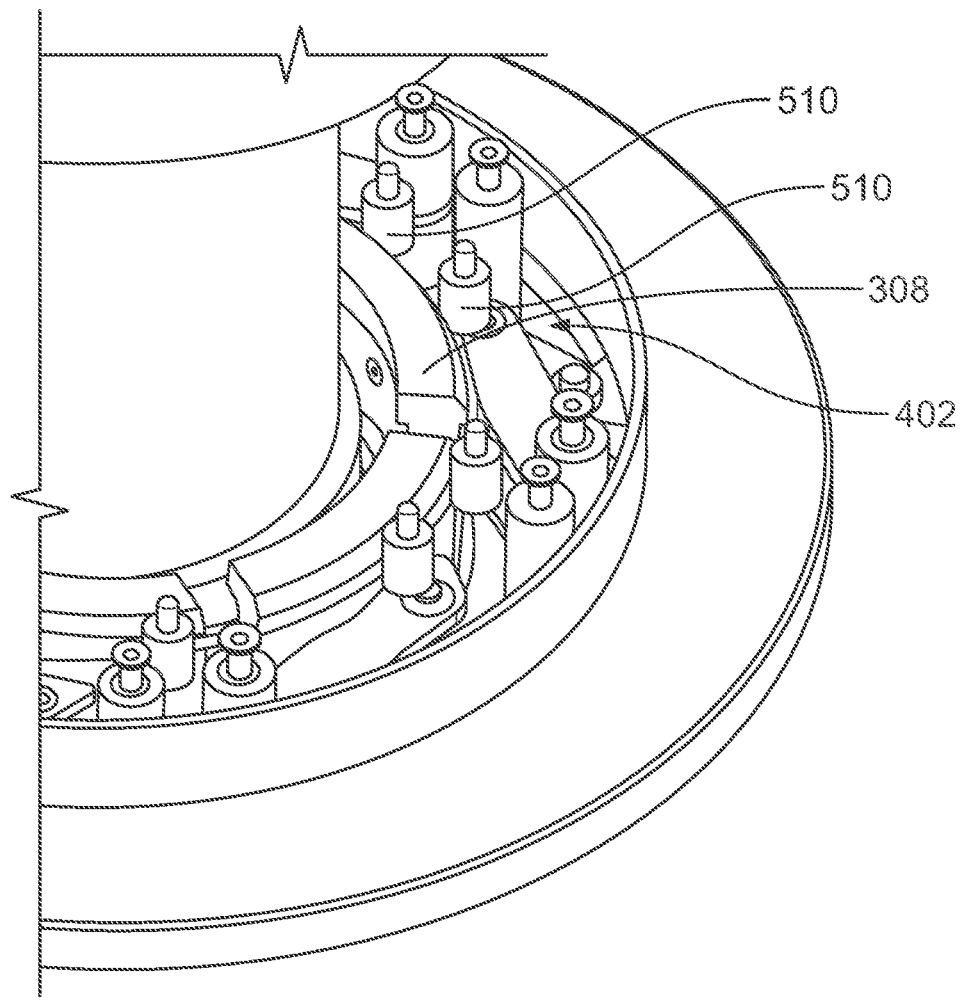
FIG. 6 is a partial perspective view of the example connector of FIGS. 3A-3B with portions removed to show soft stops.

As shown in FIG. 6, the latch 308 can include one or more bumpers or stops 510 to limit the motion of the clamps 308. The stops 510 are affixed to the housing 304 and are positioned relative to each clamp 308 such that when the clamp 308 is fully disengaged from the lines 310, 312 the clamp 308 abuts the stops 510. The stops 510 align the clamp 308 relative to the center axis 502, with the center of clamp's arc segment being near or at the center axis 502. The stops 510 can be secured to the housing 304 in a variety of ways, such as being fastened to a top cover (not shown) of the housing 304. In some implementations, two soft stops 510 are used for each clamp, but additional or fewer stops can be used.

FIG. 6 illustrates a side perspective view of the connector 302 with a guide cone 602 that funnels the second line 312 to concentrically align on the center axis 502 as it is stabbed into the guide cone 602 and then into the first line 310. The guide cone 602 is suitable for use as guide cone 110 (FIG. 2).

Figure 7:
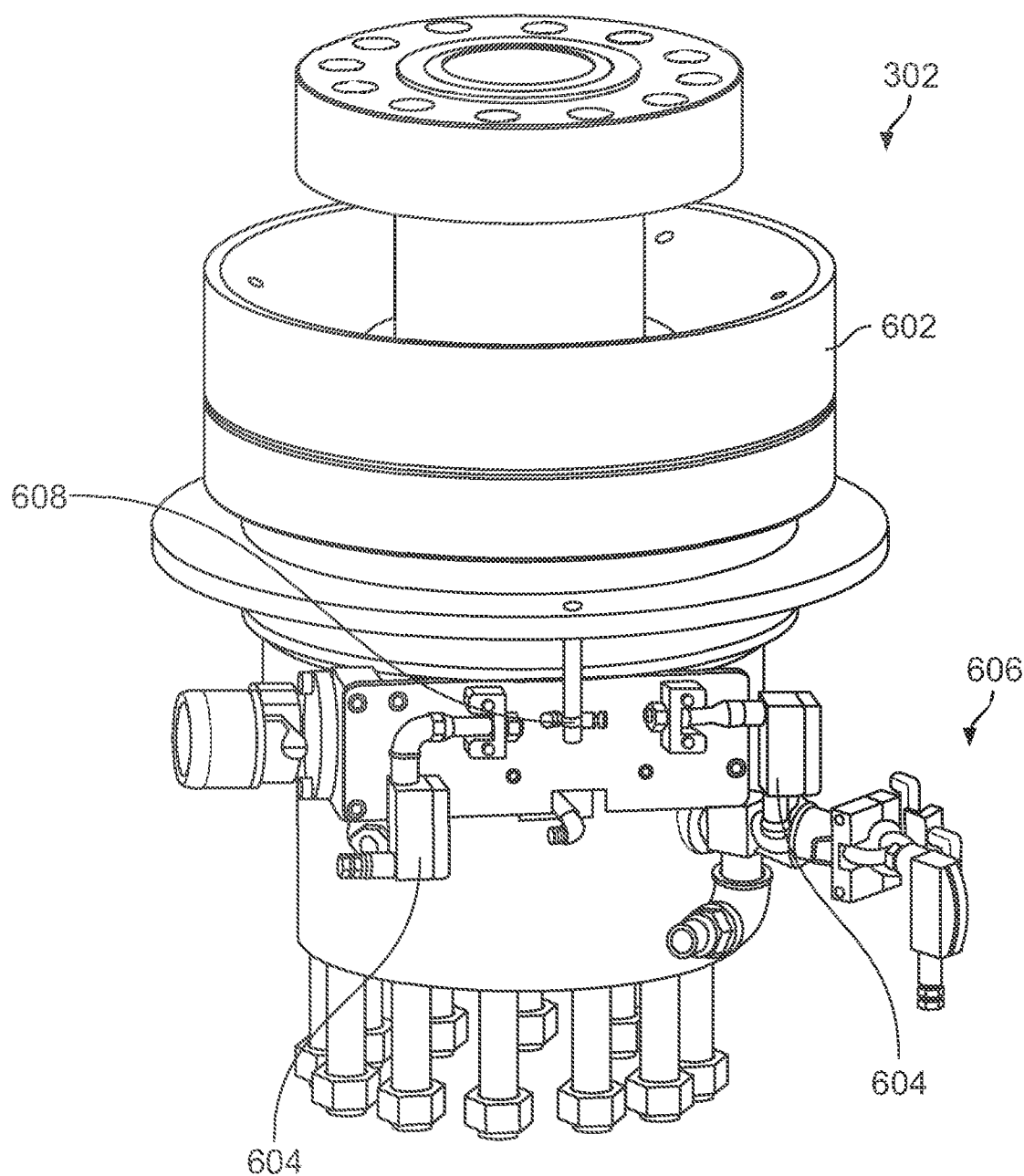
FIG. 7 is a side perspective view of the example connector of FIGS. 3A-3B.

FIG. 7 also shows a system of proximity switches 604 to detect the open/closed/intermediate state of the connector 302. The proximity sensors 604 are mounted on the housing 304 to sense the position of a corresponding magnet 608 affixed to the drive ring 306. When the drive ring 306 is rotated to engage the clamps to the first and second line 310, 312, the magnet 608 is adjacent one proximity sensor 604 and when the drive ring 306 is rotated to disengage the clamps, the magnet 608 is adjacent the opposing proximity sensor 604. As discussed below, a controller can determine the state of the latch using the proximity sensors 604 and, in turn, operate an electronic interlock.

FIG. 7 also shows a drain assembly 606 that extends through the side of the housing 304. The drain assembly 606 can operate as bleed 48 (FIG. 2). The drain assembly 606 protrudes into the bore of the connector 302 to be in fluid communication with the bores of the first and second lines 310, 312, and can be actuated open to drain fluid from the bore or actuated closed to seal against draining fluid. Thus, the drain assembly 606 can be used to equalize pressure between the central bore and the outside environment.

Figure 8A:
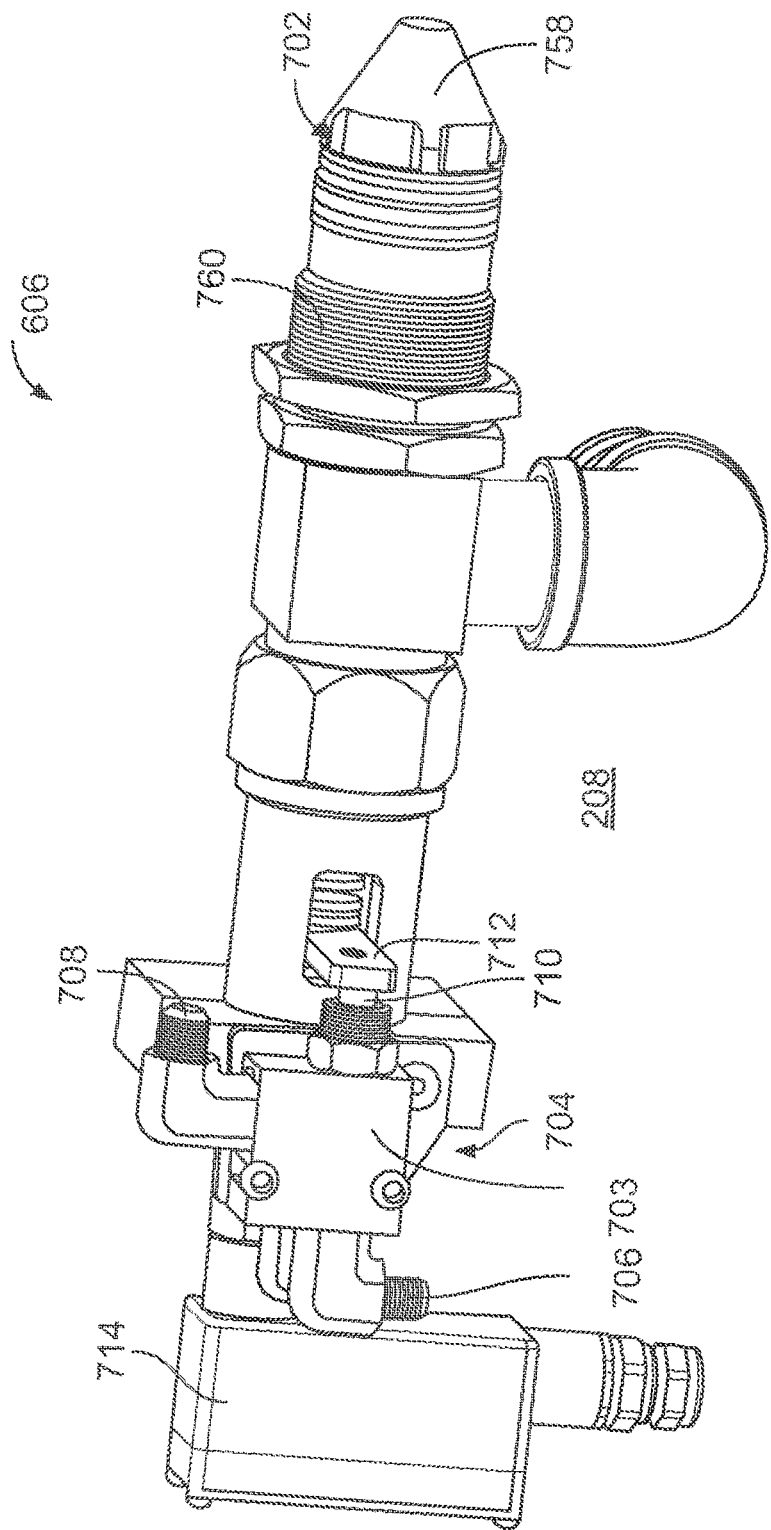

FIGS. 8A-8B are a perspective view and a half cross-sectional view, respectively, of an example drain assembly 606. The example drain assembly includes a drain valve 702 and a hydraulic interlock 704. The hydraulic interlock 704 includes a push button valve 703—a type of valve with a hydraulic input 706, a hydraulic output 708 and a valve state push button 710 that, when pushed in, opens the valve to pass fluid between the input 706 and output 708 and that, when not pushed in, seals against passage of fluid between the input 706 and output 708. In use, the valve 702 is connected between the hydraulic pump that would, in other circumstances, supply hydraulic pressure to power a hydraulic-driven, drive ring actuator used to operate the connector 302. Thus, the hydraulic input 706 is connected to the hydraulic pump while the hydraulic output 708 is connected to the hydraulic actuator (e.g., actuator 408 of FIG. 4A). The valve state button 710 interacts with a tab 712 on the drain valve 702. When the drain valve 702 is in a closed position, the tab 712 abuts and presses against the valve state button 710. The pressure applied by the tab 712 on the valve state button 710, pushes the button 710 in and puts the valve in a closed state. In the closed state, hydraulic fluid is sealed against passing from the input 706 to output 708, and onward to drive the drive ring actuator. In this state, the actuator for the drive ring can receive no pressure and the connector 302 is locked out and cannot operate to open. When the drain valve 702 is in an open position, the tab 712 is moved from the valve state button. The valve state button 710 is allowed to protrude outward, and the valve 702 moves to an open state. In the open state, hydraulic fluid can pass between input 706 and output 708 and onward to drive the hydraulic actuator. In this state, the actuator for the drive ring is able to receive hydraulic pressure and can be operated to open. In some implementations, an electrical proximity switch 714 can be included signal a state of the drain valve 702, the hydraulic interlock 704, or both.

Referring to FIG. 8B, the operation of the drain valve 702 is described. An end portion of the drain valve 702 is inserted through an aperture in the sidewall of the housing 304 of connector 302, so that a plunger 758 of the valve 702 is in the bore of the housing. The outer surface of the drain valve 702 has seals 764 that seal to the inner diameter of the aperture, sealing the drain valve 702 to the housing. The drain valve 702 is secured to the housing 304 with threads 760. When the drain valve 702 is in a closed position (as illustrated), the plunger rests on a seat 762. The seat 762 seals against passage of fluid into an interior cavity 768 of the valve 702. The seat 762 can be a metal-to-metal seat, an elastomer seat, or another type of seat. When the drain valve 702 is in an open position, the plunger 758 is moved apart from the seat 762 by the valve stem 756. Separating the plunger 758 from the seat 762 allows fluid to flow from the central bore of the housing 304, through the cavity 768 to an outlet 770. The movement of the valve stem 756 to open/close the plunger 758 is controlled by an actuator. In FIG. 8B, the actuator is a hydraulic actuator that includes a pressure inlet 750 configured to be connected to a hydraulic source, such as the hydraulic pump connected to the valve of the interlock 704 or another source, and which itself may have a control valve to gate pressure to the inlet 750. The pressure inlet 750 is fluidically connected to a spring-loaded piston 752 affixed to the valve stem 756. When pressure is applied through the inlet 750, it acts on the piston 752 driving it toward the right in FIG. 8B. The piston 752, in turn, also drives the valve stem 756 to the right, opening the valve 702 by moving the plunger 758 off the seat 762. The spring-loaded piston is biased to the left in FIG. 8b, so as to cause the valve 702 to "fail closed." That is, when there is no hydraulic pressure at the pressure inlet 750, the spring 754 of the spring-loaded piston 752 will force the drain valve 702 into the closed position shown in FIG. 8B.

Although described with the hydraulic interlock above, the connector 302 can be alternatively or additionally implemented with an electronic interlock. For example, a controller (e.g., controller 51) can monitor pressure in the central bore (e.g., via a pressure sensor in port 508 or elsewhere). If pressure above a threshold pressure is sensed in the bore, the controller can refuse to actuate the connector 302 to open (e.g., refuse to signal actuator 408 to operate) until the pressure drops below the threshold pressure.

As shown in FIG. 9, the well fracking site 1 can include a controller 51 to, among other things, monitor pressures of the operating volumes and send signals to actuate valves and/or connectors. As shown in FIG. 9, the controller 51 can include a processor 1002 (implemented as one or more local or distributed processors) and non-transitory storage media (e.g., memory 1004—implemented as one or more local or distributed memories) containing instructions that cause the processor 1002 to perform the methods described herein. The processor 1002 is coupled to an input/output (I/O) interface 1006 for sending and receiving communications with other equipment of the well fracking site 1 (FIG. 1) via communication links 53 (FIG. 2). In certain instances, the controller 51 can communicate status with and send actuation and control signals to one or more of the connectors 106, 112, the valves 44, 46 and other valves, including main valves and a swab valve of a fracturing stack, a BOP, a lubricator (and its tool trap), a well drop launcher, as well as various sensors (e.g., pressure sensors, temperature sensors and other types of sensors) at the well site. In certain instances, the controller 51 can communicate status and send actuation and control signals to one or more of the systems on the well site 1, including the blenders 3, fracking pumps 5 and other equipment on the well site 1. The communications can be hard-wired, wireless or a combination of wired and wireless. In some implementations, the controller 51 can be located remote from the manifold, such as in the data van 6, elsewhere on the well site 1 or even remote from the well site 1 (e.g., at a central monitoring facility for monitoring and controlling multiple well sites). In some implementations, the controller 51 can be a distributed controller with different portions located about the well site 1 or off site. For example, in certain instances, a portion of the controller 51 can be distributed among individual connection points 102, while another portion of the controller 51 can be located at the data van 6 (FIG. 1).

The controller 51 can operate in monitoring, controlling, and using the well fracturing site 1 for introducing or removing high pressure equipment from the manifold 7. To monitor and control the manifold 7, the controller 51 is used in conjunction with sensors to measure the pressure of fluid at various connection points of the manifold 7. Input and output signals, including the data from the sensors and actuators, controlled and monitored by the controller 51, can be logged continuously by the controller 51.

For example, an operator, via the controller 51, can orchestrate the connection/disconnection/swap of a pump 5 at a connection point 102 of the manifold 7 (FIG. 2). Notably, the human operator can operate the controller 51, and thus the resulting physical steps, at a safe distance from the high pressure lines, far enough that if there were a high pressure leak or failure, the operator would not be injured. The operation can be effectuated via a terminal or other control interface associated with the controller 51. In certain instances, the operator, via controller 51, actuates a fully automated sequence run by the controller 51 to perform the below described steps (i.e., the operator just presses start, or similar, and the controller 51 performs autonomously). Alternatively, the operator, via controller 51, commands one or more of the individual, below described steps. In either instance, the terminal can present menu items to the operator that present the operator's options in commanding the controller 51.

If the manifold 7 is at pressure, for example, with one or more of the pumps 5 connected to the manifold 7 pumping at frac pressure or at some other pressure, the manifold 7 need not be depressurized to connect another pump 5. When the manifold 7 is at pressure and no pump is connected to a certain connection point 102, the high side valve 44 and low side valve 46 of that connection point 102 are in a closed position. The truck 8 with the pump 5 is backed up to the connection point 102, and the pump discharge line 12b and pump suction line 12a are connected to their respective corresponding lines at the connection point 102. In certain instances, backing the truck 8 up to the manifold 7 stabs the pump discharge line 12b and the pump suction line 12a into their respective counterparts at the connection point 102. In instances where the low pressure side includes a length of hose with a manual connector 112 on its end, such a manual connection can be made before the truck 8 is fully positioned to stab the discharge line 12b into its counterpart at the connection point 102, or could be made after.

Thereafter, the controller 51 signals the high side connector 106 to actuate closed, securing and sealing the discharge line 12b to its counterpart at the connection point 102. If the low side connector 112 at the suction line 12a is an actuable connector (as opposed to the stab receptacle, described above, or a manual connector), the controller 51 signals the low side connector 112 to actuate closed, securing and sealing the suction line 12a to its counterpart at the connection point 102.

The controller 51 then actuates the valves 44 and 46 to open. Typically, the valve 46 on the low pressure side is opened first. This allows the pump 5 to be operated to bring pressure in the discharge line 12b up to the pressure or near the pressure in the manifold 7. After verifying the pressure is equalized across the valve 44, the controller 51 signals the valve 44 to open. The controller 51 can determine the pressures on either side of the valves 44 and 46 by receiving signals from the pressure sensors 210a, 210b on the high pressure line and sensors 212a, 212b on the low pressure line. For example, if the pressure differential, as determined from sensors 210a and 210b, is above a threshold differential, the controller 51 will not allow valve 44 on the high pressure side to open. The threshold differential, in certain instances, is determined to ensure the valve 44 does not open in an unsafe condition.

With the valves 44, 46 open, the pump 5 can be operated to pump frac fluid received through the suction line 12a to the discharge line 12b, into the manifold 7 and on to the well. In certain instances, the controller 51 can be coupled to the pump 5 to actuate the pump to begin and stop pumping, control its rate and control other operational characteristics of the pump 5.

If a pump 5 needs to be removed from the manifold 7 while the manifold 7 is at pressure, for example if the pump 5 needs maintenance or fails or is no longer needed in the operation, the pump 5 is shut down and the controller 51 actuates the valve 44 on the high pressure side to close and then actuates the valve 46 on the low pressure side to close. Thereafter, the controller 51 actuates the bleeds 48 on both the high and low pressure sides to open and depressurize the suction line 12a and discharge line 12b. The controller 51 monitors pressure at least via pressure sensor 210a, to determine whether the pressure has dropped below a specified threshold pressure before actuating connector 106 to the discharge line 12b open and release the pump 5 from the connection point 102. The specified threshold pressure can be selected to ensure that the connector 106 does not open in an unsafe condition. In instances where the low side connector 112 is actuable, the controller 51 can monitor pressure via the pressure sensor 212b and compare the pressure to a second threshold pressure before actuating low side connector 112 to open. Once disconnected, the truck 8 carrying the pump 5 can drive off. Another pump 5 can be connected to the manifold 7 at the empty connection point 102 without depressurizing the manifold 7, as described above.

The concepts described herein can, in certain instances, yield a number of advantages. For example, the operations can manifest a significant time, and thus cost, savings because, the fracturing equipment, including the manifold and associated lines, need not be pressured up and down to remove, add or change out a pump. Furthermore, pressure testing between replacing pumps can be reduced or eliminated. Cost savings can be had in fuel/energy, operator and equipment costs that would otherwise have been incurred in pumping the well and such a large volume of the fracking stack, manifold and related equipment up to pressure, both for pressure testing and pressurizing back up to fracturing pressure in performing the fracturing. Savings due to wear on equipment can also be realized, as the maintenance (e.g., repair of worn parts and greasing) on the surface equipment is reduced due to the reduction in pressure cycling. Finally, savings can be realized in reduction of non-productive operator time associated with repairing leaks that can occur from pressurizing/depressurizing multiple valves and lines of the surface equipment. Beyond time and cost saving, the operations can be safer, as personnel can remain out of the "red zone" and are not exposed to the related hazardous conditions.

A number of implementations of the have been described. Nevertheless, it will be understood that various modifications may be made. Accordingly, other implementations are within the scope of the following claims.

What is claimed is:

1. A system, comprising:
   a first fluid line;
   a connector on the first fluid line, the connector being actuable to connect to, and disconnect from, a second fluid line on a pump; and
   a controller operable to:
   (a) maintain the connection of the connector to the second fluid line on the pump at least in response to a condition associated with the pump failing to satisfy a threshold; and/or
   (b) disconnect the connector from the second fluid line on the pump at least in response to the condition associated with the pump satisfying the threshold.

2. The system of claim 1, further comprising:
   a sensor operable to sense the condition associated with the pump when the connector is connected to the second fluid line on the pump.

3. The system of claim 1, wherein the controller is operable to:
   (a) maintain the connection of the connector to the second fluid line on the pump at least in response to the condition associated with the pump failing to satisfy a threshold; and
   (b) disconnect the connector from the second fluid line on the pump at least in response to the condition associated with the pump satisfying the threshold.

4. The system of claim 1, wherein the pump is a hydraulic fracturing pump.

5. The system of claim 1, wherein the condition associated with the pump comprises a shutdown condition associated with the pump.

6. The system of claim 1, wherein the condition associated with the pump comprises a pressure condition associated with the pump.

7. The system of claim 1, wherein the condition associated with the pump comprises a discharge condition of the pump.

8. The system of claim 1, wherein the condition associated with the pump comprises a suction condition of the pump.

9. The system of claim 1, wherein the controller is operable to:
   (a) maintain the connection of the connector to the second fluid line on the pump at least in response to the condition associated with the pump failing to satisfy the threshold.

10. The system of claim 1,
    wherein the controller is operable to:
    (b) disconnect the connector from the second fluid line on the pump at least in response to the condition associated with the pump being safe for disconnection of the connector.

11. The system of claim 1, further comprising:
    a third fluid line; and
    another connector on the third fluid line, the another connector being actuable to connect to, and disconnect from, a fourth fluid line on the pump;
    wherein the controller is operable to:
    (c) maintain the connection of the another connector to the fourth fluid line on the pump at least in response to another condition associated with the pump failing to satisfy another threshold; and/or
    (d) disconnect the another connector from the fourth fluid line on the pump at least in response to the another condition associated with the pump satisfying the another threshold.

12. The system of claim 1, wherein the condition associated with the pump fails to satisfy the threshold if the condition associated with the pump is above the threshold.

13. The system of claim 1, wherein the condition associated with the pump fails to satisfy the threshold if the condition associated with the pump is below the threshold.

14. The system of claim 1, wherein the condition associated with the pump satisfies the threshold if the condition associated with the pump is below the threshold.

15. A method executable when a connector on a first fluid line is connected to a second fluid line on a pump, said connector being actuable to connect to, and disconnect from, the second fluid line of the pump, the method comprising:
    (a) maintaining, using a controller and at least in response to a condition associated with the pump failing to satisfy a threshold, the connection of the connector to the second fluid line on the pump;
    and/or
    (b) disconnecting, using the controller and at least in response to the condition associated with the pump satisfying the threshold, the connector from the second fluid line on the pump.

16. The method of claim 15, further comprising:
sensing, using a sensor, the condition associated with the pump when the connector on the first fluid line is connected to the second fluid line on the pump.

17. The method of claim 15, wherein the method comprises steps (a) and (b).

18. The method of claim 15, wherein the pump is a hydraulic fracturing pump.

19. The method of claim 15, wherein the condition associated with the pump comprises a shutdown condition associated with the pump.

20. The method of claim 15, wherein the condition associated with the pump comprises a pressure condition associated with the pump.

21. The method of claim 15, wherein the condition associated with the pump comprises a discharge condition of the pump.

22. The method of claim 15, wherein the condition associated with the pump comprises a suction condition of the pump.

23. The method of claim 15, wherein the method comprises step (a).

24. The method of claim 15, wherein the method comprises step (b).

25. The method of claim 15, wherein the method is further executable when another connector on a third fluid line is connected to a fourth fluid line on the pump, said another connector being actuable to connect to, and disconnect from, the fourth fluid line of the pump; and
wherein the method further comprises:
(c) maintaining, using a controller and at least in response to another condition associated with the pump failing to satisfy another threshold, the connection of the another connector to the fourth fluid line on the pump; and/or
(d) disconnecting using the controller and at least in response to the another condition associated with the pump satisfying the another threshold, the another connector from the fourth fluid line on the pump.

26. The method of claim 15, wherein the condition associated with the pump fails to satisfy the threshold if the condition associated with the pump is above the threshold.

27. The method of claim 15, wherein the condition associated with the pump fails to satisfy the threshold if the condition associated with the pump is below the threshold.

28. The method of claim 15, wherein the condition associated with the pump satisfies the threshold if the condition associated with the pump is below the threshold.

* * * * *